Dec. 22, 1936.  A. DAHLSTROM  2,065,056

AUTOMATIC PHONOGRAPH

Original Filed Feb. 12, 1931   8 Sheets-Sheet 1

Inventor:
Arvid Dahlstrom
By Williams Bradbury, McCaleb
& Hinkle Attys.

Dec. 22, 1936.  A. DAHLSTROM  2,065,056
AUTOMATIC PHONOGRAPH
Original Filed Feb. 12, 1931   8 Sheets-Sheet 3

Dec. 22, 1936.  A. DAHLSTROM  2,065,056
AUTOMATIC PHONOGRAPH
Original Filed Feb. 12, 1931  8 Sheets-Sheet 5

Dec. 22, 1936.     A. DAHLSTROM     2,065,056
AUTOMATIC PHONOGRAPH
Original Filed Feb. 12, 1931    8 Sheets-Sheet 6

Dec. 22, 1936.   A. DAHLSTROM   2,065,056
AUTOMATIC PHONOGRAPH
Original Filed Feb. 12, 1931   8 Sheets—Sheet 7

Inventor:
Arvid Dahlstrom
By Williams, Bradbury, McCaleb
& Hinkle Attys.

Dec. 22, 1936.    A. DAHLSTROM    2,065,056
AUTOMATIC PHONOGRAPH
Original Filed Feb. 12, 1931    8 Sheets-Sheet 8

Inventor:
Arvid Dahlstrom
By Williams, Bradbury, McCaleb
& Hinkle, Attys.

Patented Dec. 22, 1936

2,065,056

UNITED STATES PATENT OFFICE 2,065,056

AUTOMATIC PHONOGRAPH

Arvid Dahlstrom, Chicago, Ill.

Application February 12, 1931, Serial No. 515,233
Renewed October 14, 1936

28 Claims. (Cl. 274—10)

This invention relates to phonographs and more particularly to automatic phonographs wherein mechanism is provided for holding a plurality of records, and means for playing the records in succession.

An object of this invention is the provision of a simplified automatic phonograph of the type specified which is economical to manufacture and comprises a minimum of parts likely to require service.

Another object of this invention is the provision of an improved record shifting and supporting mechanism.

Another object is the provision of improved means for automatically applying an electric reproducer means to the record to be played and for removing the reproducer from the record after the latter has been reproduced.

Other objects and advantages will become apparent from the following description.

In the accompanying drawings illustrating a preferred embodiment of my invention.

Referring to the drawings more in detail, I have shown a cabinet 1 of any desired type housing my invention, the cabinet preferably having a shape and finish harmonizing with surroundings in which it is used. The front of the cabinet may be provided with a window 3 through which parts of the operating mechanism may be watched. A colored lamp 2 is mounted in the cabinet above the operating mechanism, which lamp is lighted throughout the operation of the mechanism for the purposes of attracting attention and for providing sufficient light to make the operating mechanism visible through the window 3.

Figure 1:
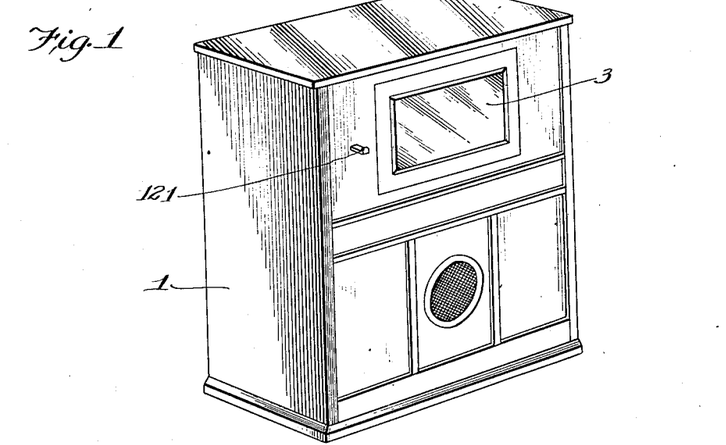
Fig. 1 is a perspective view of a cabinet containing my invention.
Figure 2:
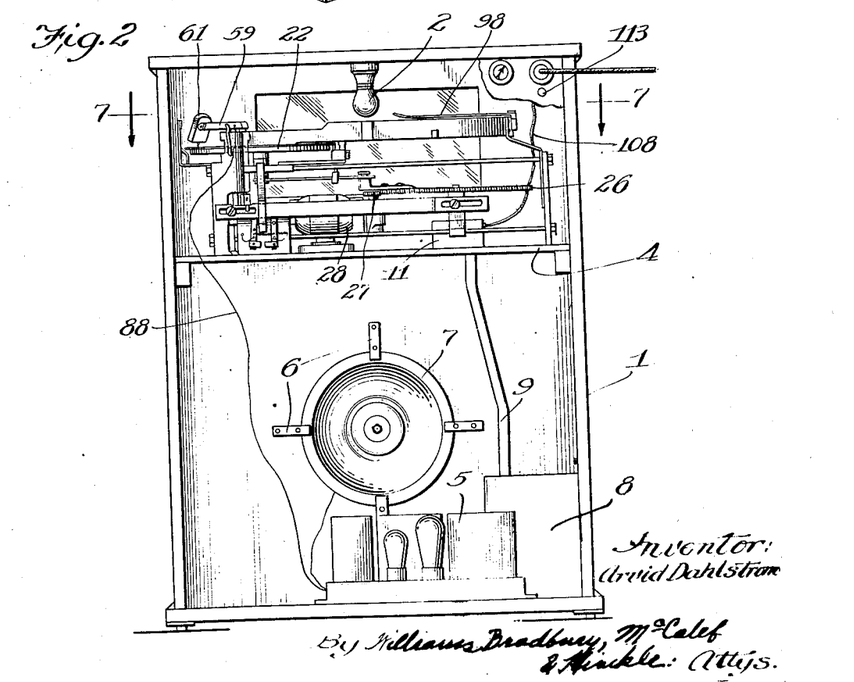
Fig. 2 is a sectional elevation of that shown in Fig. 1 showing the contents of the cabinet.

As shown in Fig. 2 the mechanism comprising my improved phonograph and driving motors therefor is supported on the shelf 4 fixed in the upper portion of the cabinet 1. In the lower part of the cabinet is provided an electrical amplifying unit 5 having a speaking unit 7 held in place by suitable clips 6. A coin receiver 8 is also located at the bottom of the cabinet and is adapted to receive coins through the chute 9 leading from a suitable coin controlled mechanism housed within the box 11, said coin controlled mechanism preferably being of the type specifically set forth in my application for patent, Serial No. 457,617, filed on May 30, 1930.

Figure 3:
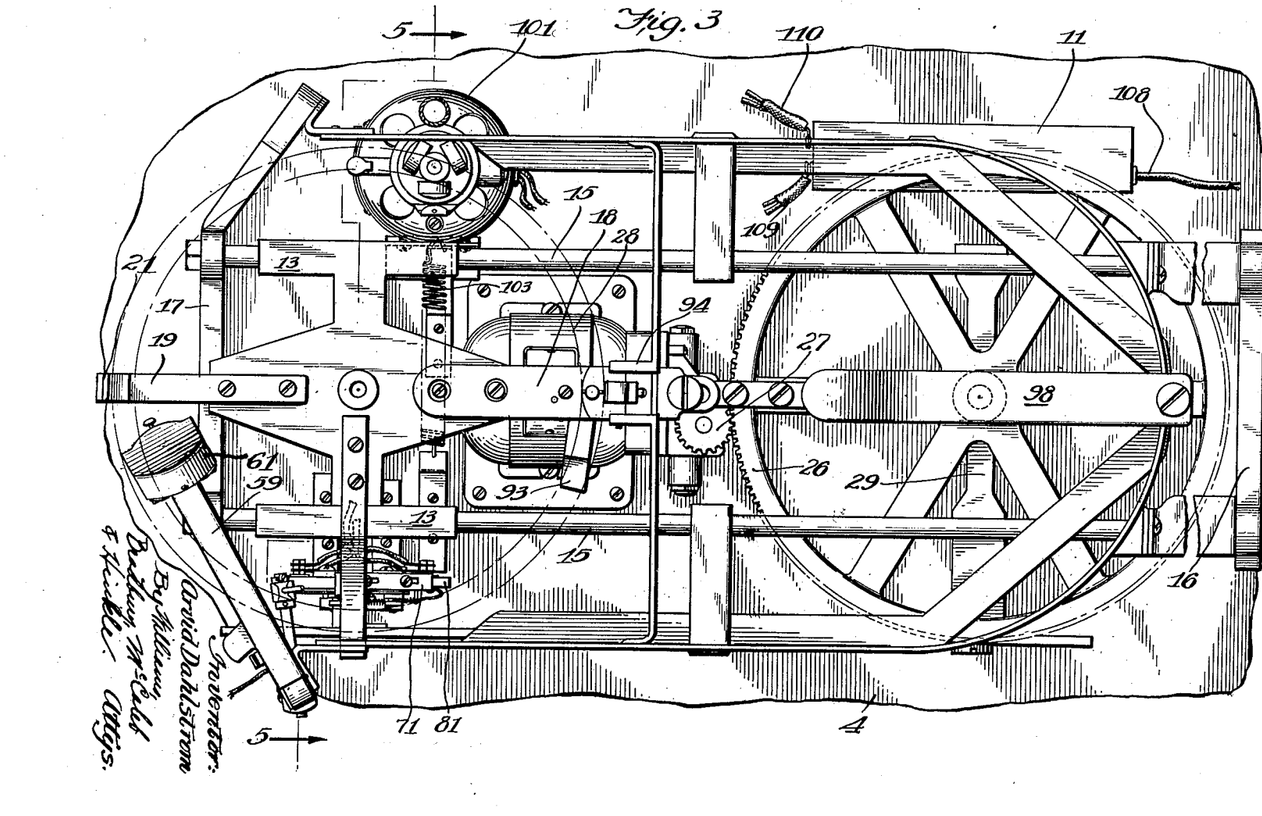
Fig. 3 is a top plan view of my improved automatic phonograph unit with the record turntable removed.
Figure 4:
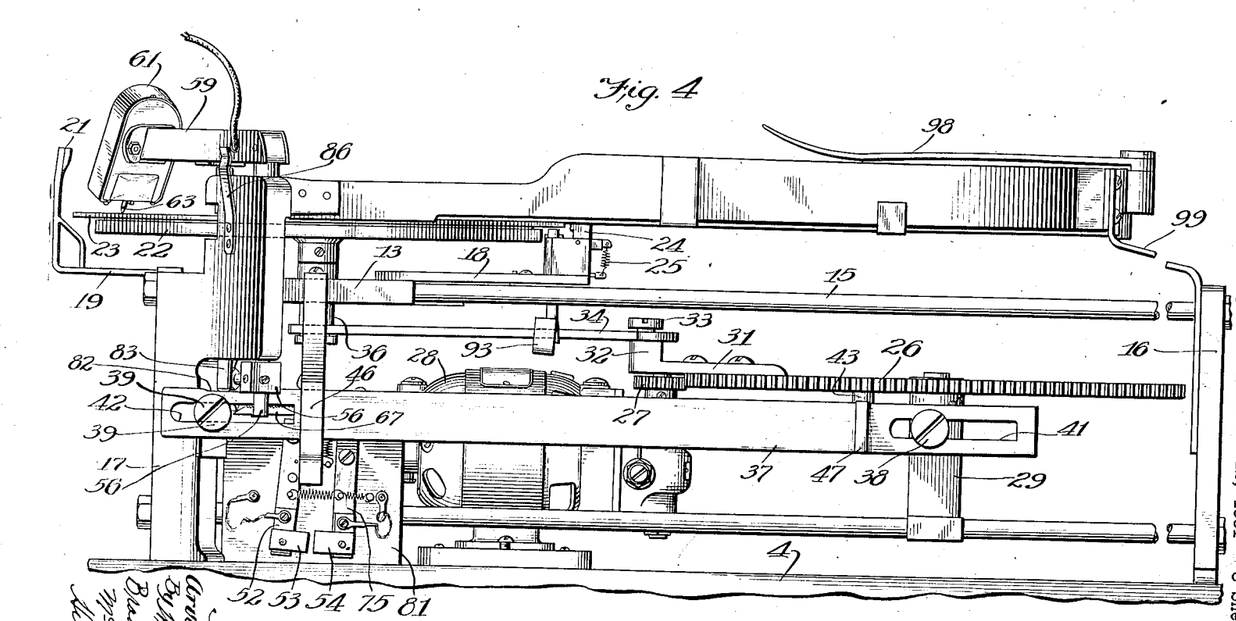
Fig. 4 is a side elevation of that shown in Fig. 3 and with the record turntable in place.
Figure 5:
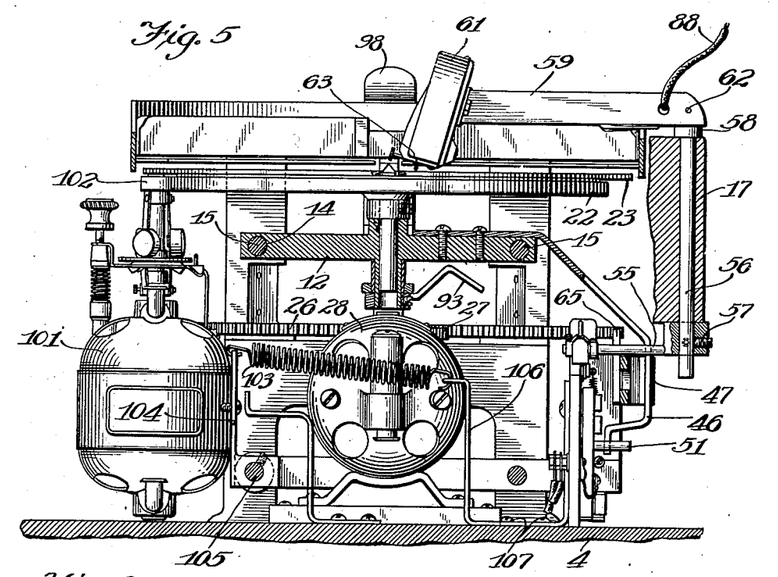
Fig. 5 is a section taken substantially on the line 5—5 of Fig. 3 but showing the turntable and its driving motor in elevation.

As best shown in Figs. 3, 4 and 5, I provide a carrier 12 which consists of a cross-head having arms 13 with cylindrical bores 14 of such size that the guide rods 15 slidably fit therein. The guide rods 15 are stationarily fixed at their ends to the frame members 16 and 17 and the cross-head or carrier reciprocates on the rods 15. The carrier 12 has longitudinally extending record moving arms 18 and 19. The arm 19 is provided with an upwardly turned end 21 which is adapted to engage a record 23 on the turntable 22 when the record carrier is shifted toward the right as viewed in Fig. 4, and the arm 18 is provided with a bell crank member 24 best shown in Fig. 8, normally held in the position illustrated, by means of a coil spring 25 for engaging and shifting a record as the carrier is moved in the opposite direction. For the purpose of shifting the carrier longitudinally of the guide rods 15, I have provided a mechanism comprising a relatively large horizontally positioned gear 26 actuated by a pinion 27 driven by an electric motor 28 which operates periodically, as will be more fully explained hereinafter. The gear 26 is rotatably mounted on a stationary cross-bracket 29 and is provided with an arm 31 fixed thereto by screws. The outer end 32 of the arm 31 is pivoted by a set screw 33 to connecting rod 34 which extends beneath the cross-head 12 and is pivoted to the depending pin 36 thereon so that when the gear 26 is rotated by the pinion 27, the connecting rod 34 will reciprocate the cross-head 12 on the guide rods 15.

Figures 9, 10:
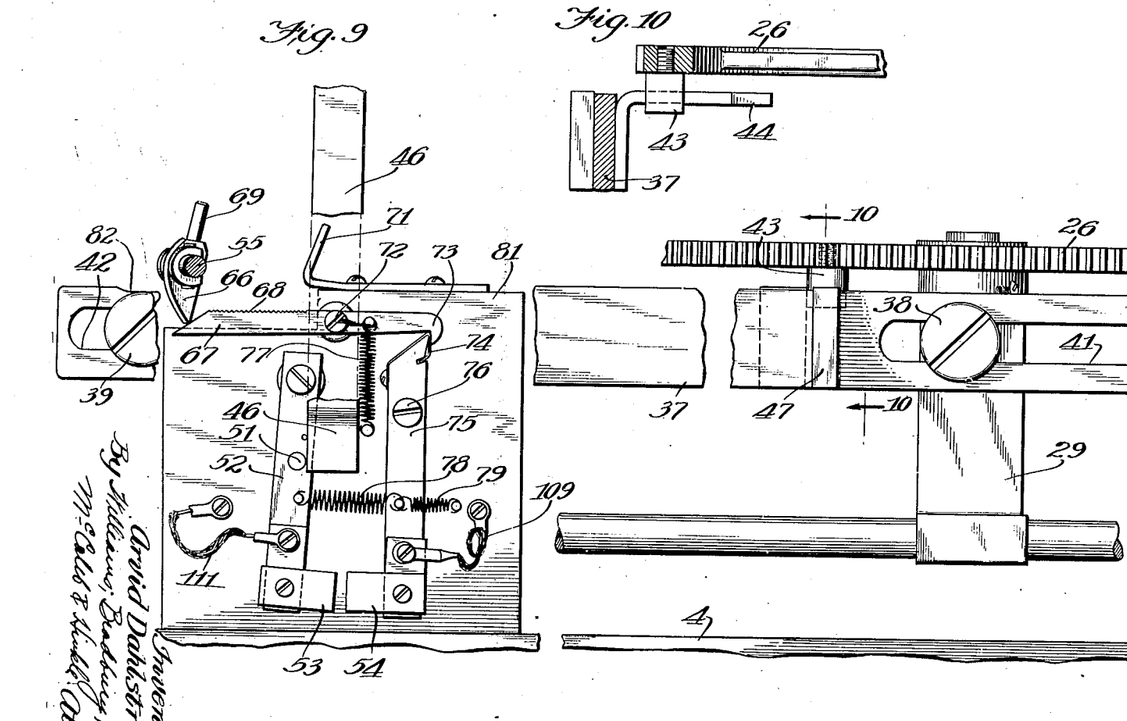
Fig. 9 is an elevation of the switch or circuit breaker for controlling the shifting motor and associated parts illustrated fragmentarily.
Fig. 10 is a section taken substantially on the line 10—10 of Fig. 9.
Figure 11:
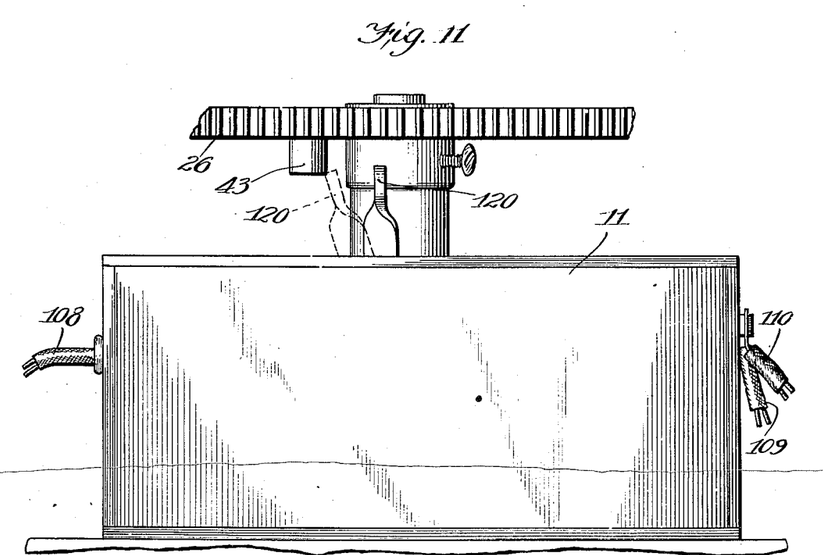
Fig. 11 is a fragmentary elevation of the record shifting gear and its association with a coin controlled mechanism.
Figure 12:
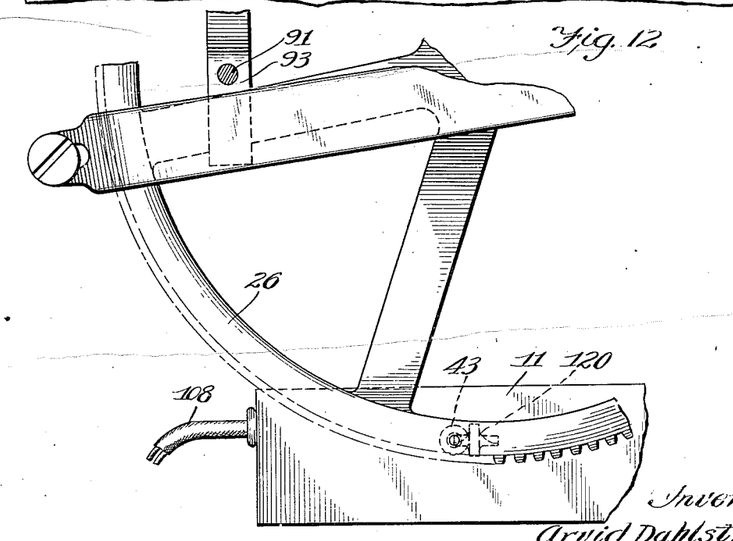
Fig. 12 is a fragmentary plan view of the mechanism shown in Fig. 11.

A longitudinally extending shift bar 37 is mounted at one end on the bracket 29 and at the other end on the frame member 17 by set screws 38 and 39 which pass through slots 41 and 42 respectively in the bar 37 to permit longitudinal sliding movement of the bar. The gear 26 is provided with a depending lug 43 (Figs. 9 and 10) which is adapted to engage an inwardly bent arm 44 fixed on the inner side of the bar 37 for the purpose of shifting the bar toward the left as the gear 26 rotates in a clockwise direction as viewed from above. The cross-head 12 is provided with a depending arm 46 which extends over the bar 37 and is adapted to engage an outwardly extending lug 47 on the bar 37 for shifting the bar to the right when the cross-head 12 is shifted to the right. The depending arm 46 is also adapted to engage a lug 51 on the switch blade 52 for separating the contacts 53 and 54 when the cross-head is moved toward the left to its extreme position. An upwardly extending lug 65 on the bar 37 engages with the ratchet arm 55 which is secured to and for rotary movement with the lower portion of the tone arm pivot pin 56 by a set screw 57 as shown in Fig. 5. The pivot pin 56 is provided with a head 58 resting on the upper edge of the frame portion 17 for supporting the pin 56 in position. The upper end of the pin 56 is hingedly fixed to the tone arm 59 of the reproducer 61 by a hinge pin 62. The reproducer 61 may be of any suitable type which includes a needle or the like 63 adapted to engage the record 23 for reproducing the same. The inner end of the arm 55 is provided with a pawl 66 which when moved to the right, as viewed in Fig. 9, rides upon the ratchet 67 engaging the teeth 68 thereof. As it moves to the right the extension 69 on the upper end thereof engages a stationary upwardly bent arm 71 on the sliding block 81 causing the lower portion to press downwardly on the ratchet 67, and because the ratchet is pivoted at 72, this downward force on one end causes the hook 73 to be gradually lifted from its engagement with the spring catch 74 on the upper end of the switch blade 75 which is pivoted at 76. The catch 73 is normally urged downwardly by coil spring 77. The switch blades 52 and 75 are yieldingly urged toward each other by a coil spring 78 and the blade 75 is yieldingly urged toward the right by a weaker spring 79.

Figure 6:
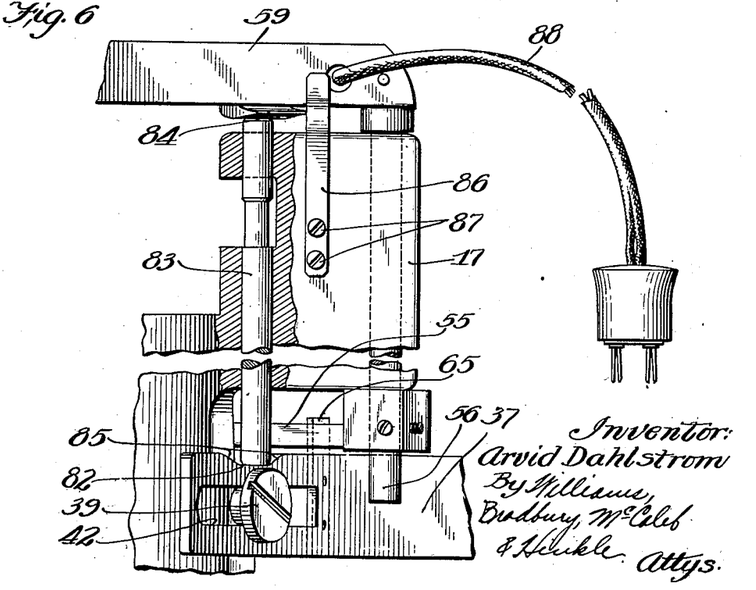
Fig. 6 is an enlarged fragmentary elevation, partly in section, illustrating the tone arm actuating mechanism.
Figure 7:
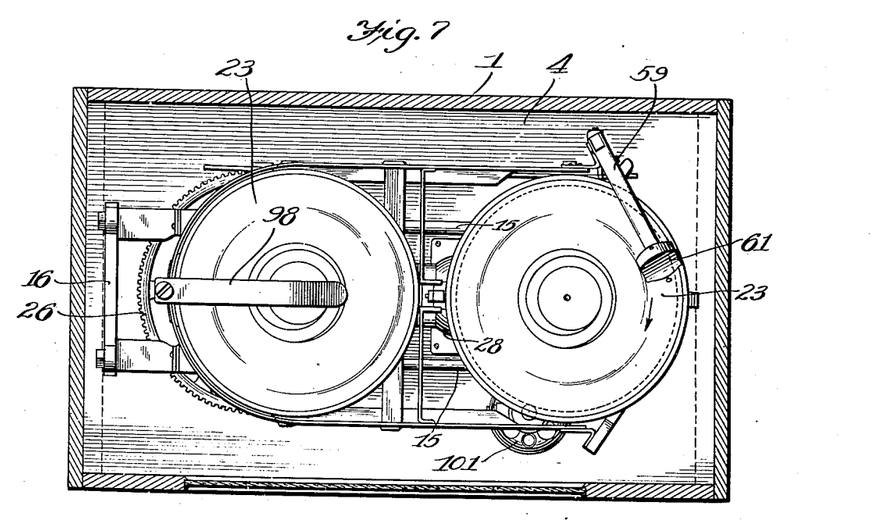
Fig. 7 is an enlarged horizontal section taken on the line 7—7 of Fig. 2.

Adjacent the left end of the bar 37, as viewed in Fig. 6, is provided a recess 82 in the upper edge thereof into which is seated a lift pin 83 having its upper end engaging a bearing plate 84 on the tone arm 59 such that as the tone arm oscillates above the record being reproduced the plate 84 always remains on the upper end of the pin 83. By this arrangement it is possible to lift the reproducer from the record at any point in its travel by lifting the pin 83 slightly from the position shown in Fig. 6. To accomplish this lifting action, the recess 82 is provided with sloping cam ends 85 such that when the bar 37 is shifted longitudinally in either direction out of the position shown in Fig. 6, the pin 83 is caused to ride upwardly over one of the cam surfaces 85 and ride upon the upper surface of the bar 37, thus lifting the reproducer from the record or above the plane normally occupied by the record while being reproduced. When the lug 65 moves away from the ratchet arm 55, the leaf spring 86 fixed to the frame 17 by screws 87 moves the tone arm 59 a slight amount such that the reproducer will engage in the marginal groove of the record 23 upon lowering of the tone arm. The tone arm is preferably provided with an electric cable 88 which may lead to the amplifying unit 5 in the lower part of the cabinet.

Figure 8:
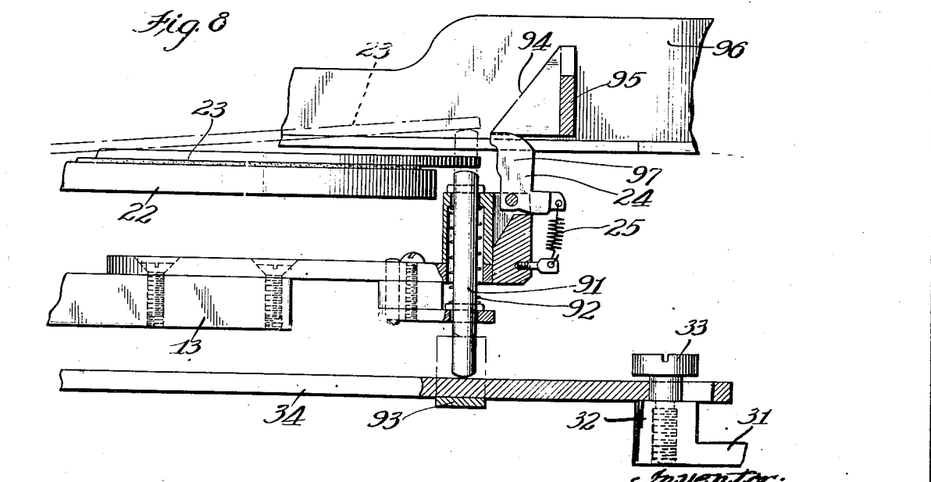
Fig. 8 is a fragmentary elevation, partly in section, of a part of the record shifting mechanism.

Referring to Figs. 4 and 8, I have illustrated means for lifting the record from its position on the turntable and depositing it in the record supporting compartment. A vertically movable pin 91 normally urged to its lowermost position as illustrated in full lines in Fig. 8, by means of a spring 92, is adapted to engage beneath the margin of a record 23 and lift the same into the position shown in broken lines. The pin 91 is moved to its raised position by a cam arm 93 fixed on the connecting rod 34 such that when the connecting rod is moved beneath the pin 91 the cam arm 93 causes the pin 91 to lift the record. While the record 23 is in the position shown in Fig. 8, the arm 21 on the left end of the cross-head 12 engages the left edge of the record and forces it toward the right, causing it to ride upwardly over the cam 94 on the cross-member 95 forming one side of the record holding compartment. The bell crank arm 24 being pivoted and normally urged to the position shown in Fig. 8, is adapted to pass beneath a stack of records in the record supporting compartment consisting of the cross-member 95 and the confining band 96, and after passing beneath the stack of records it normally assumes its uppermost position and the forward edge 97 engages behind the lowermost record in the compartment and upon subsequently moving toward the left it moves the lowermost record with it, depositing the same upon the turntable 22 in the position shown in Fig. 4. The record supporting compartment is provided with an inwardly extending tongue 98 which is adapted to engage the record 23 as it passes from the turntable to the compartment for guiding the record into position. The record compartment is preferably supported at the right end by a bracket 99 secured to the frame member 16.

For the purpose of driving the turntable I have provided a motor 101 having a friction wheel 102 on the upper end of its armature shaft, which wheel is normally urged toward the turntable by a coil spring 103 fixed at one end to the motor bracket 104 which is pivoted at 105 and fixed at the other end to an upwardly extending arm 106 secured by screws 107 to the shelf 4.

Figure 13:
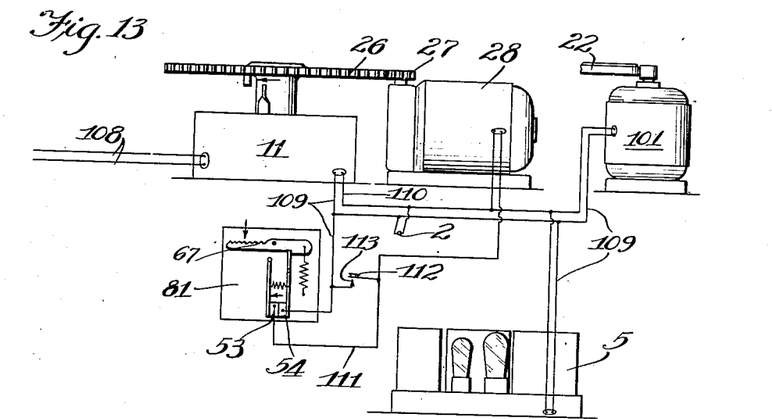
Fig. 13 is a diagrammatic illustration of parts of my invention and including a wiring diagram of the preferred form of my invention.
Figure 14:
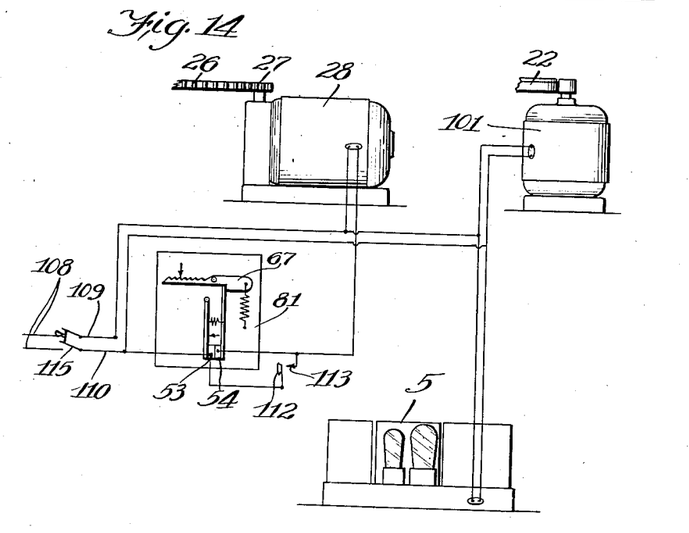
Fig. 14 is a view similar to Fig. 13 with the omission of the coin controlled mechanism, which modification is particularly adaptable for domestic use.

Referring to Figs. 13 and 14 I have illustrated a wiring diagram showing the main power line 108 connected into the coin controlled mechanism 11. The conductor 109 passes from the coin controlled mechanism to the motor 101 and to the amplifying unit 5. The cable 109 also extends to the contact member 54. The contact member 53 is connected by a conductor 111 to the motor 28 which drives the gear 26 through the medium of the pinion 27. The conductor 110 also extends from the coin controlled mechanism to the motors 28 and 101 and to the amplifying unit 5. For the purpose of short circuiting the switch mechanism comprising contacts 53 and 54 I have provided a manually operable switch comprising contacts 112 and 113 which are respectively connected to cables 109 and 111.

In the wiring diagram illustrated in Fig. 14 the main line 108 is directly connected through a suitable knife switch 115 to the conductors 109 and 110, the coin controlled mechanism being entirely eliminated and the pilot light 2 being omitted.

In the operation of my invention as herein illustrated and described, beginning with the mechanism in the position illustrated in Fig. 4 with a record 23 on the turntable 22 and with the reproducer engaging the record, the motor 101 is driving the turntable so that the reproducer gradually moves toward the center, carrying with it the inner end of the tone arm together with the ratchet arm 55 attached to the lower end of the tone arm pivot 56. When the pawl 66 on the ratchet arm 55 moves to the right a sufficient distance that the record has been fully reproduced, the ratchet 67 is forced downwardly and the hook 73 is lifted against the action of the spring 77, permitting the switch blade 75 to move in a clockwise direction by the force of the spring 78, thus closing the contacts 53 and 54, which completes the circuit through the motor 28. The motor 28 immediately starts and causes the gear wheel 26 to rotate, which reciprocates the cross-head 12 to the right and at the beginning of this movement the cam arm 93 lifts the inner edge of the record so that it slides upwardly over the cam 94 by reason of force exerted on the opposite edge of the record by the upturned arm 21. Also at the beginning of this motion the lug 43 on the gear wheel 26 shifts the bar 37 to the left, which through the medium of the lug 65 rotates the reproducer to the left sufficiently that it is in position for beginning the reproduction of another record.

Prior to any appreciable movement of the reproducer, the cam face 85 lifts the pin 83, which in turn lifts the tone arm for raising the reproducer from the record, so that as it is swung to the left about the pivot pin 56 it does not scrape across the face of the record.

When the cross-head or carrier moves toward the right, the depending arm 46 leaves contact with the pin 51 on the switch blade 52, permitting the switch blade to oscillate under the force of springs 78 and 79 to such a position that the hook 73 will engage over the upper end 74 on the switch blade 75, thus preparing the switch to be again opened by the arm 46 when it again engages the pin 51. Subsequently and while the carrier is still moving toward the right, the depending arm 46 contacts the lug 47 on the horizontal bar 37 and forces it toward the right.

As the record passes into the compartment which is adapted to support a stack of records, the tongue 93 guides the record into position on the top of the stack. The bell crank arm 24 passes beneath the stack of records and engages the further edge of the lowermost record, and upon continuation of movement of the gear 26 the cross-head together with the turntable mounted thereon is caused to move to the left.

As the cross-head oscillates toward the left, carrying with it a record from the bottom of the stack by the aid of the bell crank arm 24, the turntable makes contact with the friction wheel on the armature shaft of the motor 101 which it left when it moved toward the right, and begins rotation for the reproduction of the record then on the turntable. As the cross-head approaches the limit of its movement toward the left, the arm 46 engages the pin 51, breaking the circuit between the contacts 53 and 54, thus stopping the shifting motor 28. Just prior to the stopping of the motor 28, the lug 43 on the gear 26 engages the arm 44 on the bar 37 and moves the bar 37 a slight distance to the left sufficient, however, to permit the pin 83 to drop into the recesses 82, thus lowering the reproducing needle 63 onto the margin of the record, whereupon the new record in position is reproduced and the cycle of operation is continuously repeated unless the circuit is broken.

When it is desirable to use my invention in public places where it is intended that the patrons shall pay for the music, the coin controlled mechanism 11 may be employed for breaking the circuit at some intimate point in the cycle of operation.

In Figs. 3, 11, 12 and 13 I have shown an adaptation of the coin controlled mechanism to my invention. By the arrangement illustrated the lug 43 on the gear wheel 26 engages an arm 120 extending from the coin controlled mechanism, when the lug is in such a position that the record, having been reproduced, has been moved to position on the stack of records. As the lug 43 passes over the arm 120, it is first pressed to the position shown in Fig. 11 in broken lines and it then snaps back to vertical position as shown in full lines, by which movement the circuit is broken and is reestablished only by the insertion of a coin in the coin slot 121 on the front of the cabinet, which coin passes through the mechanism 11 and is deposited in the coin box 8 after passing through the conduit 9 from the mechanism 11 to the box 8. This coin controlled mechanism is not a part of this invention and is therefore not described in detail but it constitutes the invention of my application hereinbefore referred to.

If for any reason it is desired to remove a record from the turntable without first having it reproduced or at any time during the reproduction of the record prior to its completion, the switch comprising contacts 112 and 113 may be closed, which forms a shunt across the contacts 53 and 54 and begins the cycle of operation the same as though the record had been completed and the contacts 53 and 54 had been closed in the manner previously described.

It will be apparent to those skilled in the art that modifications may be made in the form of my invention, disclosed in the accompanying drawings and herein described, without departing from the principle of my invention, and I desire to avail myself of such changes and modifications as come within the scope of the appended claims.

I claim as my invention:

1. In a phonograph of the class described, in combination means for supporting a stack of records, a reproducer, a slidably mounted frame carrying a turntable, means controlled by said reproducer for reciprocating said frame for successively removing each record from the stack, means engaging a record on the turntable during said reciprocation for removing the record and elevating it to the top of the stack, means on the frame engaging the lowermost record of the stack for transferring the same to the turntable for sound reproduction, and auxiliary controlling means operable to cause reciprocation of said frame to replace the record on the stack without subjecting the record to the operation of said reproducer.

2. In a phonograph of the class described, in combination means for supporting a stack of records, a reproducer, movable turntable mechanism for successively removing each record from the bottom of a stack in said supporting means, carrying it to a reproducing position, supporting it while being reproduced, and stationary means for guiding it to the top of the stack after being reproduced, means supporting said reproducer for horizontal movement above the record reproducing position, means associated with said reproducer and dependent on the position thereof for controlling the actuation of said turntable mechanism, and auxiliary means independent of the position of said reproducer for controlling the actuation of said turntable mechanism.

3. In a phonograph of the class described, in combination means for supporting a stack of records, a reproducer, transfer mechanism for successively removing each record from the bottom of a stack in said supporting means, carrying it to a reproducing position, supporting it while being reproduced, and means cooperating with said transfer mechanism to return said record to the top of the stack after being reproduced, said mechanism comprising a record carrier reciprocable between the reproducing position and a position beneath the stack supporting means, and means for actuating said carrier.

4. In a phonograph of the class described, in combination means for supporting a stack of records, a reproducer, transfer mechanism for successively removing each record from the bottom of a stack in said supporting means, carrying it to a reproducing position, supporting it while being reproduced, and means cooperating with said transfer mechanism for returning it to the top of the stack after being reproduced, said mechanism comprising a record carrier reciprocable between the reproducing position and a position beneath the stack supporting means, means for actuating said carrier, means supporting said reproducer for horizontal movement above the record reproducing position, and means associated with said reproducer and dependent on the position thereof for controlling the actuation of said carrier actuating means.

5. In a phonograph of the class described, in combination a frame, a support on said frame for holding a stack of records, a reproducer on said frame mounted for limited universal movement, transfer mechanism automatically operable for successively removing each record from a stack in said supporting means, carrying it to a reproducing position, supporting it while being reproduced, and returning it to the stack after being reproduced, said mechanism comprising a guide rod on said frame, a cross-head carrier reciprocable along said guide rod, and means for reciprocating said cross-head.

6. In a phonograph of the class described, in combination a frame, a support on said frame for holding a stack of records, a reproducer on said frame mounted for limited universal movement, transfer mechanism automatically operable for successively removing each record from a stack in said supporting means, carrying it to a reproducing position, supporting it while being reproduced, and returning it to the stack after being reproduced, said mechanism comprising a guide rod on said frame, a cross-head carrier reciprocable along said guide rod, means for reciprocating said cross-head, and means associated with said reproducer and dependent upon the position thereof for controlling the actuation of said mechanism.

7. In a phonograph of the class described, in combination a frame, a support on said frame for holding a stack of records, a reproducer on said frame mounted for limited universal movement, mechanism for successively removing each record from a stack in said supporting means, carrying it to a reproducing position, supporting it while being reproduced, and returning it to the stack after being reproduced, said mechanism comprising a guide rod on said frame, a cross-head carrier reciprocable along said guide rod, means for reciprocating said cross-head, and means for automatically controlling the actuation of said mechanism.

8. In a phonograph of the class described, in combination a frame, a support on said frame for holding a stack of records, a reproducer on said frame mounted for limited universal movement, mechanism for successively removing each record from a stack in said supporting means, carrying it to a reproducing position, supporting it while being reproduced, and returning it to the stack after being reproduced, said mechanism comprising a guide rod on said frame, a cross-head carrier reciprocable along said guide rod, means for reciprocating said cross-head, means for automatically controlling the actuation of said mechanism comprising an electric switch, and means associated with said reproducer and dependent on the position thereof for closing said switch.

9. In a phonograph of the class described, in combination a frame, a support on said frame for holding a stack of records, a reproducer on said frame mounted for limited universal movement, and a transfer mechanism automatically operable for successively removing each record from a stack in said supporting means, carrying it to a reproducing position, supporting it while being reproduced, and returning it to the stack after being reproduced, said mechanism comprising horizontal guide rods, a cross-head carrier reciprocable between said guide rods, and an electric motor operably connected with said cross-head for reciprocating the same.

10. In a phonograph of the class described, in combination a frame, a support on said frame for holding a stack of records, a reproducer on said frame mounted for limited universal movement, and a transfer mechanism automatically operable for successively removing each record from a stack in said supporting means, carrying it to a reproducing position, supporting it while being reproduced, and returning it to the stack after being reproduced, said mechanism comprising horizontal guide rods, a cross-head carrier reciprocable between said guide rods, an electric motor operably connected with said cross-head for reciprocating the same, an electric circuit for said motor, a switch in said circuit, and means operably connected with said motor for opening said switch when said cross-head carrier reaches a predetermined position.

11. In a phonograph of the class described, in combination a frame, a support on said frame for holding a stack of records, a reproducer on said frame mounted for limited universal movement, mechanism for successively removing each record from a stack in said supporting means, carrying it to a reproducing position, supporting it while being reproduced and returning it to the stack after being reproduced, said mechanism comprising horizontal guide rods, a cross-head carrier reciprocable between said guide rods, an electric motor operably connected with said cross-head for reciprocating the same, an electric circuit for said motor, a switch in said circuit, means operably connected with said motor for opening said switch when said cross-head carrier reaches a predetermined position, and means for reclosing said switch dependent on the position of said reproducer.

12. In a phonograph of the class described, in combination a frame, a support on said frame for holding a stack of records, a reproducer on said frame mounted for limited universal movement, mechanism for successively removing each record from a stack in said supporting means to a reproducing position and returning it to the stack after being reproduced, said mechanism comprising horizontal guide rods, a cross-head carrier reciprocable between said guide rods, an electric motor operably connected with said cross-head for reciprocating the same, an electric circuit for said motor, a switch in said circuit, means operably connected with said motor for opening said switch when said cross-head carrier reaches a predetermined position, a turntable on said carrier for supporting a record to be reproduced and a motor for rotating said turntable.

13. In a phonograph of the class described, in combination a frame, a support on said frame for holding a stack of records, a reproducer on said frame mounted for limited universal movement, mechanism for successively removing each record from a stack in said supporting means to a reproducing position and returning it to the stack after being reproduced, said mechanism comprising horizontal guide rods, a cross-head carrier reciprocable between said guide rods, an electric motor operably connected with said cross-head for reciprocating the same, an electric circuit for said motor, a switch in said circuit, means operably connected with said motor for opening said switch when said cross-head carrier reaches a predetermined position, and means for reclosing said switch dependent on the position of said reproducer, a turntable on said carrier for supporting a record to be reproduced and a motor for rotating said turntable.

14. In a phonograph of the class described, in combination a frame, a support on said frame for holding a stack of records, a reproducer on said frame mounted for limited universal movement, mechanism for successively removing each record from a stack in said supporting means to a reproducing position and returning it to the stack after being reproduced, said mechanism comprising horizontal guide rods, a cross-head carrier reciprocable between said guide rods, an electric motor operably connected with said cross-head for reciprocating the same, an electric circuit for said motor, a switch in said circuit, means operably connected with said motor for opening said switch when said cross-head carrier reaches a predetermined position, a turntable on said carrier for supporting a record to be reproduced, a motor for rotating said turntable, and cooperating means associated with said carrier adapted to transfer a record from said turntable to the top of the stack when the carrier is moved to its extreme position in one direction.

15. In a phonograph of the class described, in combination a frame, a support on said frame for holding a stack of records, a reproducer on said frame mounted for limited universal movement, mechanism for successively removing each record from a stack in said supporting means to a reproducing position and returning it to the stack after being reproduced, said mechanism comprising horizontal guide rods, a cross-head carrier reciprocable between said guide rods, an electric motor operably connected with said cross-head for reciprocating the same, an electric circuit for said motor, a switch in said circuit, means operably connected with said motor for opening said switch when said cross-head carrier reaches a predetermined position, means for reclosing said switch dependent on the position of said reproducer, a turntable on said carrier for supporting a record to be reproduced and a motor for rotating said turntable, cooperating means associated with said carrier adapted to transfer a record from said turntable to the top of the stack when the carrier is moved to its extreme position in one direction, and other means associated with said carrier adapted to transfer a record from the bottom of the stack to the turntable when the carrier is moved to its extreme position in the opposite direction.

16. In a phonograph of the class described in combination, a frame, a reproducing unit, means pivotally securing said unit to said frame for limited universal movement, and means for operably lifting the free end of said unit, said lifting means comprising a horizontally movable bar, record changing means actuating said bar, a cam on said bar, and a vertically movable lifting pin interposed between said unit and said bar, said cam being operable to move said pin upon horizontal movement of said bar to permit a played record to be removed from, and another record to be placed in playing position when the playing unit is in elevated position.

17. In a phonograph of the class described in combination, a frame, a reproducing unit, means pivotally securing said unit to said frame for limited universal movement, and means for operably lifting the free end of said unit, said lifting means comprising a horizontally movable bar, record changing mechanism actuating said bar, a cam on said bar, and a vertically movable lifting pin interposed between said unit and said bar, said securing means comprising a vertical pivot pin passing through a portion of said frame and means for securing said unit to said vertical pivot pin, the bar being actuated to elevate the reproducing unit before a played record is removed and being again actuated to lower the reproducing unit after another record is placed in position.

18. In a phonograph of the class described in combination, a frame, a reproducing unit, means pivotally securing one end of said unit to said frame, means for lifting the free end of said unit and means for horizontally swinging said unit, said lifting means comprising a horizontally movable bar, record changing mechanism actuating said bar, a cam on said bar, and a vertically movable lift pin interposed between said unit and said bar, said cam being operable to move said pin upon horizontal movement of said bar in timed relation to the removal and replacement of a record from and to playing position.

19. In a phonograph of the class described in combination, a frame, a reproducing unit, means pivotally securing one end of said unit to said frame, means for lifting the free end of said unit and means for horizontally swinging said unit, said securing means comprising a vertically extending pivot pin mounted in said frame, a head on said pivot pin interposed between said unit and said frame, and a horizontal pivot hingedly securing said unit to said vertical pivot pin at a point above said head, said lifting and swinging means comprising a horizontally movable bar, a cam on said bar, means on said bar engaging the reproducing unit, and a vertically movable lift pin interposed between said unit and said bar.

20. In a phonograph of the class described in combination, a frame, a reproducing unit, means pivotally securing one end of said unit to said frame, means for lifting the free end of said unit and means for horizontally swinging said unit, said securing means comprising a vertical pivot pin passing through a portion of said frame and means securing said unit to said vertical pivot pin, said lifting means comprising a horizontally movable bar, a cam on said bar, a vertically movable lift pin interposed between said unit and said bar, and an arm on said bar adapted to engage said swinging means.

21. In a phonograph of the class described in combination, a frame, a reproducing unit, means pivotally securing one end of said unit to said frame, means for lifting the free end of said unit and means for horizontally swinging said unit, said securing means comprising a vertically extending pivot pin mounted in said frame, a head on said pivot pin interposed between said unit and said frame, and a horizontal pivot hingedly securing said unit to said vertical pivot pin at a point above said head, said lifting means comprising a horizontally movable bar, a cam on said bar, and a vertically movable lift pin interposed between said unit and said bar, said swinging means comprising a horizontal arm on said vertical pivot pin, extending adjacent said horizontally movable bar, a lug on said bar adapted to engage said arm, and means for actuating said bar.

22. In a phonograph of the class described in combination, a record carrier, a connecting rod for moving said carrier, cooperating means on said carrier for lifting one edge of a record from said carrier as said connecting rod moves said carrier in one direction.

23. In a phonograph of the class described in combination, a record carrier, a connecting rod for actuating said carrier, cooperating means on said carrier for lifting one edge of a record from said carrier as said carrier moves in one direction, and means actuated by said connecting rod for placing a record on said carrier in reproducing position.

24. In a phonograph of the class described in combination, a record carrier, a connecting rod for actuating said carrier, cooperating means on said carrier for lifting one edge of a record from said carrier as said carrier moves in one direction, said cooperating means comprising a vertically movable pin on said carrier, means normally urging said pin downwardly, means limiting the downward movement of said pin, and a cam on said connecting rod adapted to pass beneath and lift said pin.

25. In a phonograph of the class described in combination, a record carrier including a cross-head, a motor for actuating said cross-head, a switch controlling said motor, means on said cross-head operably engageable with a portion of said switch for opening the same upon movement of said carrier to a predetermined position, means for reclosing said switch, means on said carrier for removing a record therefrom, and other means on said carrier for positioning another record thereon in reproducing position.

26. In a phonograph of the class described in combination, a frame, a record carrier on said frame, means on said frame for supporting a stack of records, means on said carrier for moving a record toward said supporting means, a cam guide on said supporting means for engaging and lifting a record as it is moved toward the same, and means for limiting the height of lifting of a record.

27. In a phonograph of the class described in combination, a frame, a record carrier on said frame, means on said frame for supporting a stack of records, means on said carrier for moving a record toward said supporting means, a cam guide on said supporting means for engaging and lifting a record as it is moved toward the same, said moving means comprising a relatively large horizontally positioned gear beneath said stack supporting means, a motor for actuating said gear, and circuit opening means actuated by said gear for stopping said motor.

28. In a phonograph of the class described in combination, a reciprocable record carrier, a gear for actuating said carrier, means for reproducing a record on said carrier, means for positively moving said reproducing means in one direction comprising a horizontally movable bar, means on said gear for shifting said bar in one direction and means on said carrier for shifting said bar in the opposite direction.

ARVID DAHLSTROM.